US011072489B2

(12) United States Patent
Bhat et al.

(10) Patent No.: US 11,072,489 B2
(45) Date of Patent: Jul. 27, 2021

(54) BEVERAGE-INGREDIENT CARTRIDGE AND CAP FOR BEVERAGE-INGREDIENT CARTRIDGE

(71) Applicant: PepsiCo, Inc., Purchase, NY (US)

(72) Inventors: Advait Bhat, White Plains, NY (US); Girish Nilkanth Deshpande, Carmel, NY (US); Maximiliano Rodriguez, Bridgewater, NJ (US); Benjamin Joseph Tantanella, New York, NY (US); Bruno Telesca, Sandy Hook, CT (US); Nathan Daniel Grubbs, West Chester, OH (US); Ryan Alan Klenke, St. Henry, OH (US)

(73) Assignee: PepsiCo, Inc., Purchase, NY (US)

( * ) Notice: Subject to any disclaimer, the term of this patent is extended or adjusted under 35 U.S.C. 154(b) by 53 days.

(21) Appl. No.: 16/541,011

(22) Filed: Aug. 14, 2019

(65) Prior Publication Data

US 2021/0047105 A1   Feb. 18, 2021

(51) Int. Cl.
*B65D 85/80* (2006.01)
*B65D 25/08* (2006.01)
(Continued)

(52) U.S. Cl.
CPC .......... *B65D 85/804* (2013.01); *A47J 31/407* (2013.01); *B65D 25/082* (2013.01)

(58) Field of Classification Search
CPC .............. B65D 85/804; B65D 85/8043; B65D 85/8046; B65D 25/04; B65D 25/08;
(Continued)

(56) References Cited

U.S. PATENT DOCUMENTS 3,548,562 A * 12/1970 Schwartzman .... B65D 81/3211
53/440
6,021,892 A 2/2000 Baudin
(Continued)

FOREIGN PATENT DOCUMENTS

FR     2949303 B1    3/2011

OTHER PUBLICATIONS

International Search Report and Written Opinion of the International Searching Authority in International Application No. PCT/US2020/045370, dated Oct. 22, 2020 (9 pages).

*Primary Examiner* — Ericson M Lachica
(74) *Attorney, Agent, or Firm* — Sterne, Kessler, Goldstein & Fox P.L.L.C.

(57) ABSTRACT

A beverage-ingredient cartridge for storing and dispensing beverage ingredients. The cartridge includes a container for storing a first beverage ingredient, and a cap secured within an open upper end of the container that seals the open upper end. The cap includes a storage compartment for storing a second beverage ingredient having a base and a sidewall extending from a the base. A line of weakness defines a separable region of the base, and a column extends from the separable region of the base and is spaced apart from the sidewall. A plastic film is secured to the sidewall and to the column that seals the storage compartment. Upon application of a force to the column, the separable region separates from the base and the plastic film tears such that the storage compartment and container are open to the outside of the beverage-ingredient cartridge.

20 Claims, 9 Drawing Sheets

(51) Int. Cl.
*A47J 31/40* (2006.01)
*B65D 85/804* (2006.01)

(58) Field of Classification Search
CPC .... B65D 25/082; B65D 51/22; B65D 51/222; B65D 51/226; B65D 51/002; B65D 51/2814; B65D 51/2835; B65D 51/2842; B65D 51/285; B65D 41/20; B65D 41/205; B65D 41/50; B65D 41/505; B65D 43/02; B65D 47/36; B65D 47/38; A47J 31/407

See application file for complete search history.

(56) References Cited

U.S. PATENT DOCUMENTS

| | | | |
|---|---|---|---|
| 2002/0066677 A1* | 6/2002 | Moscovitz | B65D 51/2835 206/219 |
| 2004/0026422 A1* | 2/2004 | Westphal | B65D 51/224 220/277 |
| 2007/0102306 A1* | 5/2007 | Lantos | B65D 51/2842 206/219 |
| 2010/0140209 A1* | 6/2010 | Valentine | B65D 51/2835 215/228 |
| 2012/0183657 A1 | 7/2012 | Marina et al. | |
| 2014/0326725 A1* | 11/2014 | Clarkson | B65D 50/00 220/212 |
| 2015/0174542 A1 | 6/2015 | Lee et al. | |
| 2017/0073143 A1* | 3/2017 | Sheldon | B65D 51/28 |
| 2017/0305613 A1* | 10/2017 | Giraud | B65D 83/04 |
| 2017/0354289 A1 | 12/2017 | Marina et al. | |
| 2018/0134470 A1* | 5/2018 | Edwards | B65D 51/2835 |
| 2019/0118991 A1* | 4/2019 | Takayama | B65D 23/102 |

* cited by examiner

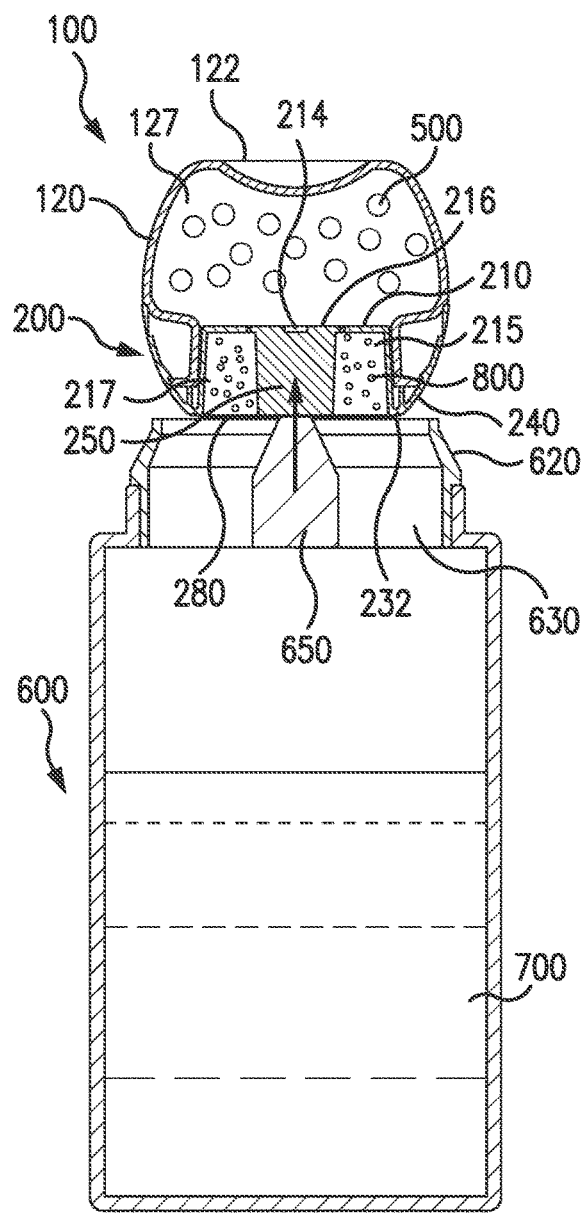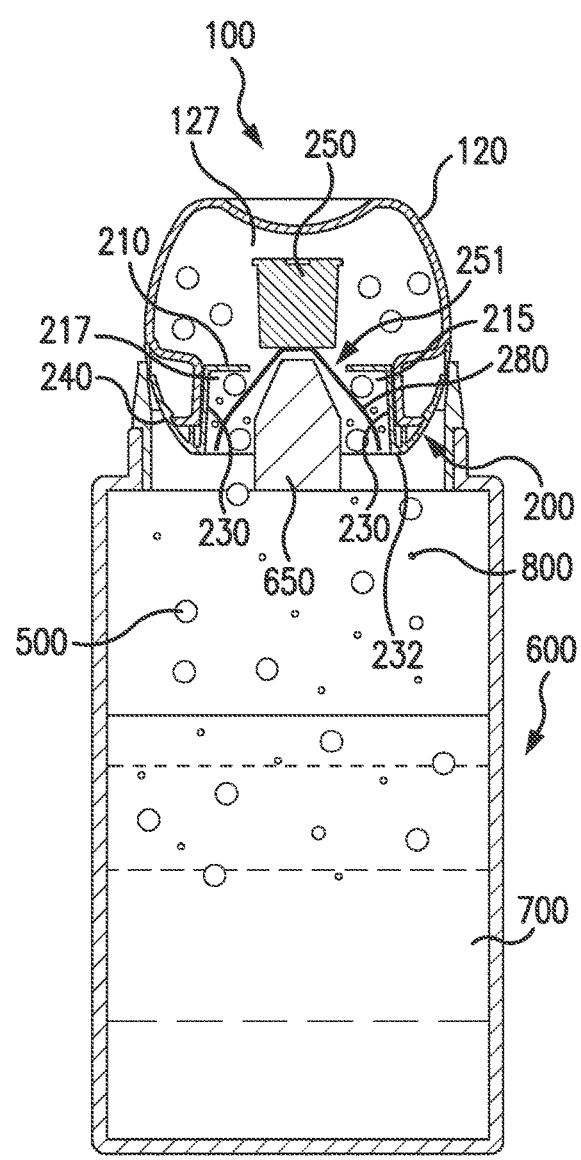
FIG. 10A
FIG. 10B

BEVERAGE-INGREDIENT CARTRIDGE AND CAP FOR BEVERAGE-INGREDIENT CARTRIDGE

FIELD

Embodiments described herein generally relate to a beverage-ingredient cartridge. Specifically, embodiments described herein relate to a beverage-ingredient cartridge having a cap that allows the beverage ingredients to be dispensed from the cartridge upon application of a force to the cap.

BRIEF SUMMARY OF THE INVENTION

Some embodiments are directed to a beverage-ingredient cartridge that includes a container having a closed lower end and an open upper end, wherein the container is configured to store a first beverage ingredient, and a cap secured within the open upper end of the container, wherein the cap seals the open upper end of the container. The cap of the beverage-ingredient cartridge includes a storage compartment having a base and a sidewall extending from the base in a direction away from a closed lower end of the container, wherein the storage compartment is configured to store a second beverage ingredient; a column extending from the base in a direction away from a closed lower end of the container, wherein the column is spaced from the sidewall; a line of weakness defining a separable region of the base, wherein the column extends from the separable region of the base; and a plastic film secured to a rim at an upper end of the sidewall and to the column, wherein the plastic film seals the storage compartment. Upon application of a force to the column, the separable region separates from the base and the plastic film tears such that the storage compartment and the container are open to an environment outside of the beverage-ingredient cartridge.

Some embodiments are directed to system for making a beverage that includes a beverage-ingredient cartridge as described herein, and further including a liquid beverage ingredient disposed within the container and a dry beverage ingredient disposed within the storage compartment of the cap. The system for making a beverage further includes a beverage vessel having a cartridge opener and containing a liquid, wherein when the beverage-ingredient cartridge is inverted and is engaged with the cartridge opener of the beverage vessel, the cartridge opener pushes the column into the container and thereby breaks the plastic film and separates the separable region from the base of the cap so as to release the liquid and dry beverage ingredients from the beverage-ingredient cartridge into the liquid under the force of gravity.

Some embodiments are directed to cap for a beverage-ingredient cartridge that includes a storage compartment comprising a base and a sidewall extending from a perimeter of the base, wherein the storage compartment is configured to store a beverage ingredient; a column extending from the base of the storage compartment and spaced apart from the sidewall; a line of weakness defining a separable region of the base, wherein the column extends from the separable region of the base; and a plastic film secured to a rim at an upper end of the sidewall and to an upper end of the column, wherein the plastic film seals the storage compartment. Upon application of a force to the column, the plastic film is configured to tear and the separable region is configured to separate from the base.

Some embodiments described herein are directed to a method for dispensing beverage ingredients from a beverage-ingredient cartridge that includes applying a force to a beverage-ingredient cartridge, wherein the beverage-ingredient cartridge includes a container for storing a first beverage ingredient, and a cap secured to an upper end of the container by a snap-fit. The cap of the beverage-ingredient cartridge includes a storage compartment having a base and a sidewall extending from the base, a line of weakness on the base defining a separable region of the base, a column extending from the separable region of the base, and a plastic film secured to a rim at an upper end of the sidewall and to the column that encloses the storage compartment. The method further includes disengaging the column from the base of the cap by application of the force such that the plastic film tears and the separable region is separated from the base of the cap, and dispensing the first and second beverage ingredients from the beverage-ingredient cartridge.

In any of the various embodiments discussed herein, an outer surface of the container may be substantially continuous with an outer surface of the cap.

In any of the various embodiments discussed herein, the container, the cap, and the plastic film may each include recyclable plastic materials.

In any of the various embodiments discussed herein, the cap may be secured to the container via snap-fit. In some embodiments, the container may include a neck at the open upper end, and the sidewall of the cap may be in facing engagement with the neck of the container within the open upper end of the container.

In any of the various embodiments discussed herein, the cap may further include an oxygen scavenger having an annular configuration, and the oxygen scavenger may be arranged on an underside of the base of the storage compartment such that the oxygen scavenger surrounds the separable region.

In any of the various embodiments discussed herein, the column may have a transverse cross sectional area having a linear section having a first side opposite a second side, a first curved piece on the first side and a second curved piece on the second side, and the line of weakness may at least partially follow a shape of the column.

In any of the various embodiments discussed herein, when the separable region separates from base, the plastic film may remain connected to the column and may separate from the rim. In some embodiments, the cap may further include fins extending inwardly from the sidewall that define flow paths when the plastic film separates from the rim.

In any of the various embodiments discussed herein, the separable region may be one of a plurality of separable regions, and wherein each of the plurality of separable regions includes a column.

In any of the various embodiments discussed herein, the force required to break the line of weakness may be about 5 to about 40 pound-force.

In any of the various embodiments discussed herein, the line of weakness may define a separable region having a circular shape, and the column may be centrally positioned on the separable region.

In any of the various embodiments discussed herein, the line of weakness may include a groove formed on a lower surface of the base of the storage compartment.

In any of the various embodiments discussed herein, the beverage-ingredient cartridge may be inverted prior to applying the force to the column of the cap, such that dispensing the first and second beverage ingredients occurs under the force of gravity.

In any of the various embodiments discussed herein, applying a force to the column of the cap may be performed by a cartridge opener applied along a longitudinal axis of the beverage-ingredient cartridge.

In any of the various embodiments discussed herein, when the column is disengaged from the base of the cap, the plastic film may separate from the rim and remain attached to the column.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

FIGS. 10A and 10B show views of a beverage-ingredient cartridge of FIG. 1 as used to dispense beverage ingredients into a vessel.

DETAILED DESCRIPTION OF THE INVENTION

Figure 1:
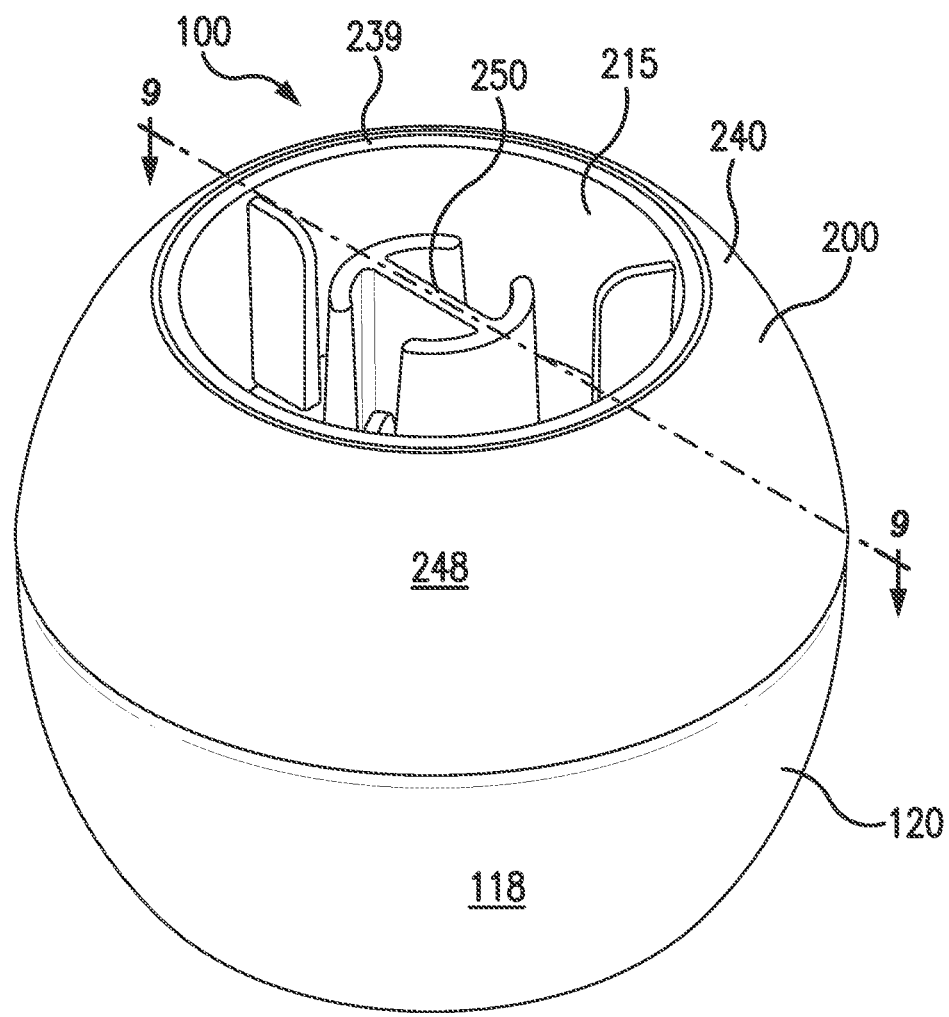
FIG. 1 shows a perspective view of a beverage-ingredient cartridge according to an embodiment.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, the terms "upper" and "lower," and "top" and "bottom," and the like are intended to assist in understanding of embodiments of the invention with reference to the accompanying drawings with respect to the orientation of the beverage cartridge as shown, and are not intended to be limiting to the scope of the invention or to limit the invention scope to the embodiments depicted in the Figures. The directional terms are used for convenience of description and it is understood that a cap for a beverage-ingredient cartridge, and a beverage-ingredient cartridge including the cap may be positioned in any of various orientations.

Beverage-ingredient cartridges may contain one or more beverage ingredients for addition to water or another base liquid to create a beverage. A consumer can quickly and easily make a beverage by mixing the contents of the beverage-ingredient cartridge with water, which may be readily available to the user. Beverage-ingredient cartridges provide consumers with a convenient method for adding beverage ingredients to water or other base liquids rather than purchasing a pre-mixed beverage. Beverage-ingredient cartridges also provide a user with the experience of preparing and mixing their own beverage which some consumers may prefer to simply purchasing a pre-packaged beverage.

Some existing beverage-ingredient cartridges include an aluminum foil seal that covers an opening of the cartridge. The aluminum foil seal can be punctured in order to release the beverage ingredients from the cartridge. However, the aluminum foil seal can be difficult to puncture optimally. Difficulty puncturing the aluminum foil and dispensing the beverage ingredients from the cartridge may be frustrating and inconvenient for the consumer and may negatively impact the consumer's experience. If a consumer cannot readily open the beverage-ingredient cartridge and dispense the beverage ingredients, the consumer may be less likely to purchase and use additional beverage-ingredient cartridges in the future.

Further, in many cases, in order to recycle a beverage-ingredient cartridge having an aluminum foil seal the aluminum foil may need to be separated from the plastic recyclable components of the cartridge. Consumers may find it time-consuming and inconvenient to separate the components of the cartridge in order to recycle the separated components.

Some embodiments described herein relate to a beverage-ingredient cartridge for storing beverage ingredients that includes a cap configured to allow the beverage ingredients to be released from the cartridge upon application of a force to the cap. Further, some embodiments as described herein relate to a beverage-ingredient cartridge that is composed of recyclable plastic materials such that the beverage-ingredient cartridge is readily recyclable without separating and sorting the components of the cartridge, which promotes recycling, thereby raising recycling rates.

Some embodiments described herein relate to a beverage-ingredient cartridge 100, as shown in FIG. 1, that includes a container 120 for storing a first beverage ingredient, and a cap 200 for sealing container 120 and for storing a second beverage ingredient. The term "beverage ingredient" as used herein refers to any edible substance usable to create a beverage (i.e., as a part thereof), whether in liquid or solid ("dry") form, such as sweeteners, colorants, vitamins, minerals, nutrients, adjuncts, or flavorings, including coffee, tea, fruit juice, or concentrates, among others beverage enhancements and combinations thereof. A liquid beverage ingredient may have any viscosity, and may have a low viscosity such that beverage ingredient is water-like or may have a high viscosity such that beverage ingredient is syrup-like. For example, liquid beverage ingredient may be a concentrate, such as a juice, tea or coffee concentrate, an extract, or a honey or syrup, among others. Solid beverage ingredients may be in powdered or granule form, and may be configured to dissolve when mixed with a liquid, such as water. For example, the solid beverage ingredient may be sugar, cane sugar, demerara sugar, or raw sugar, or other natural or artificial sweeteners (e.g., stevia), or may be spices, such as cinnamon, or other flavorings.

In some embodiments, container 120 may store a beverage ingredient and cap 200 may be empty, cap 200 may store a beverage ingredient and container 120 may be empty, or both container 120 and cap 200 may store a beverage ingredient. In embodiments in which container 120 and cap 200 both store beverage ingredients, the beverage ingredients may be the same or may be different. For example, a first beverage ingredient may be in liquid form in one of container 120 or cap 200, while a second beverage ingredient may be in a solid (e.g., powdered or granule) form in the other of container 120 or cap 200. Further, cartridge 100 may be used to store beverage ingredients for producing a specific type of beverage when mixed with a base liquid, such as water or carbonated water. For example, cartridge 100 may store a tea or coffee extract in container 120 and a sweetener in a cap 200 of cartridge 100, so that when the contents of cartridge 100 are mixed with water, a sweetened and flavored tea or coffee beverage is produced.

Figure 2:
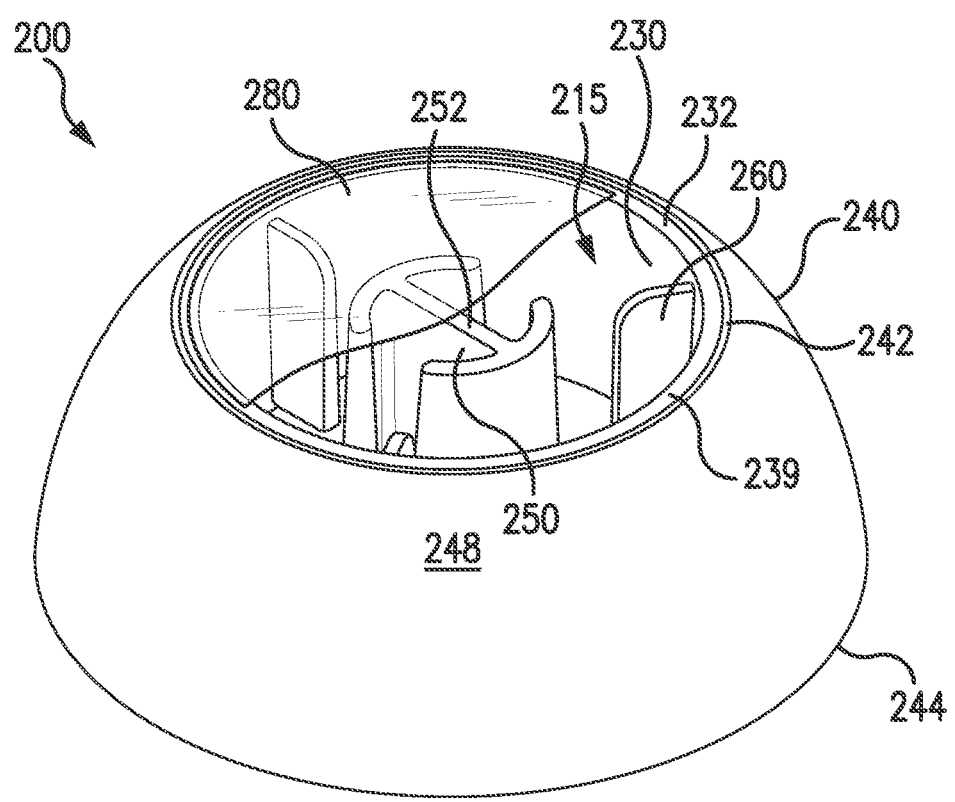
FIG. 2 shows a perspective view of the cap of the beverage-ingredient cartridge according to FIG. 1.
Figure 3:
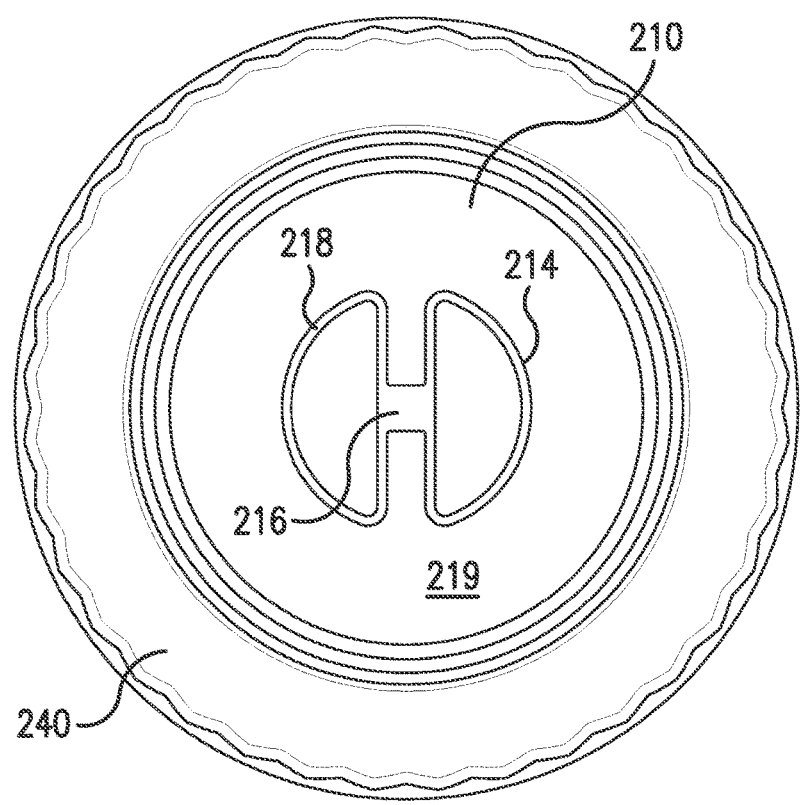
FIG. 3 shows a bottom view of the cap of FIG. 2.
Figure 4:
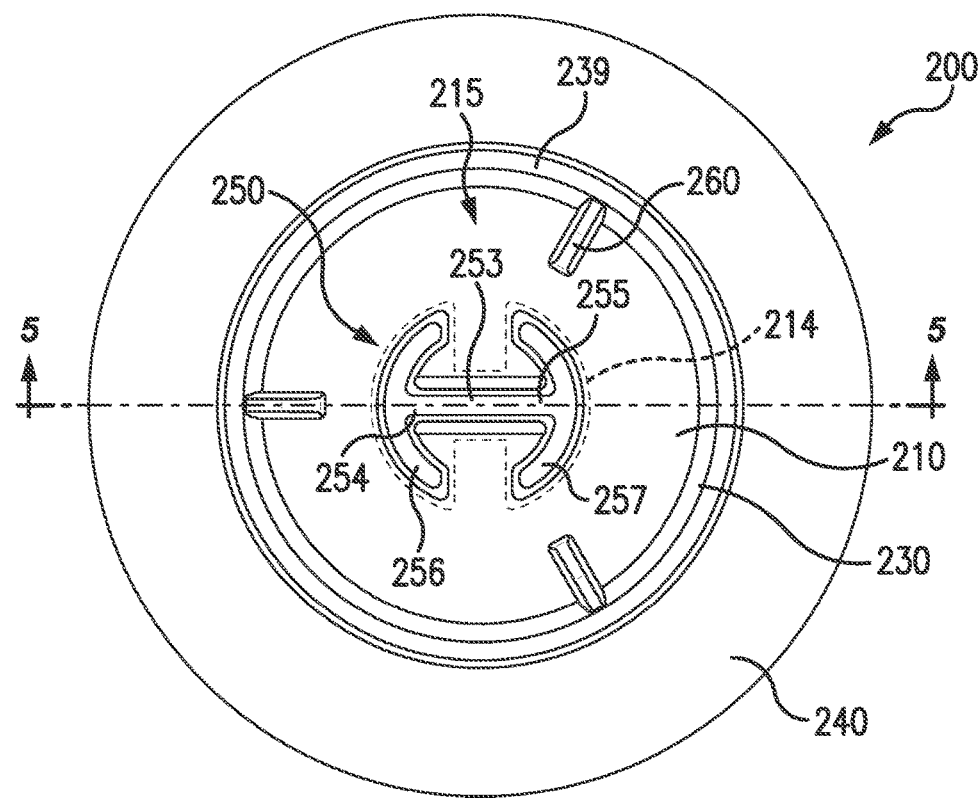
FIG. 4 shows a top-down view of the cap of FIG. 2.
Figure 5:
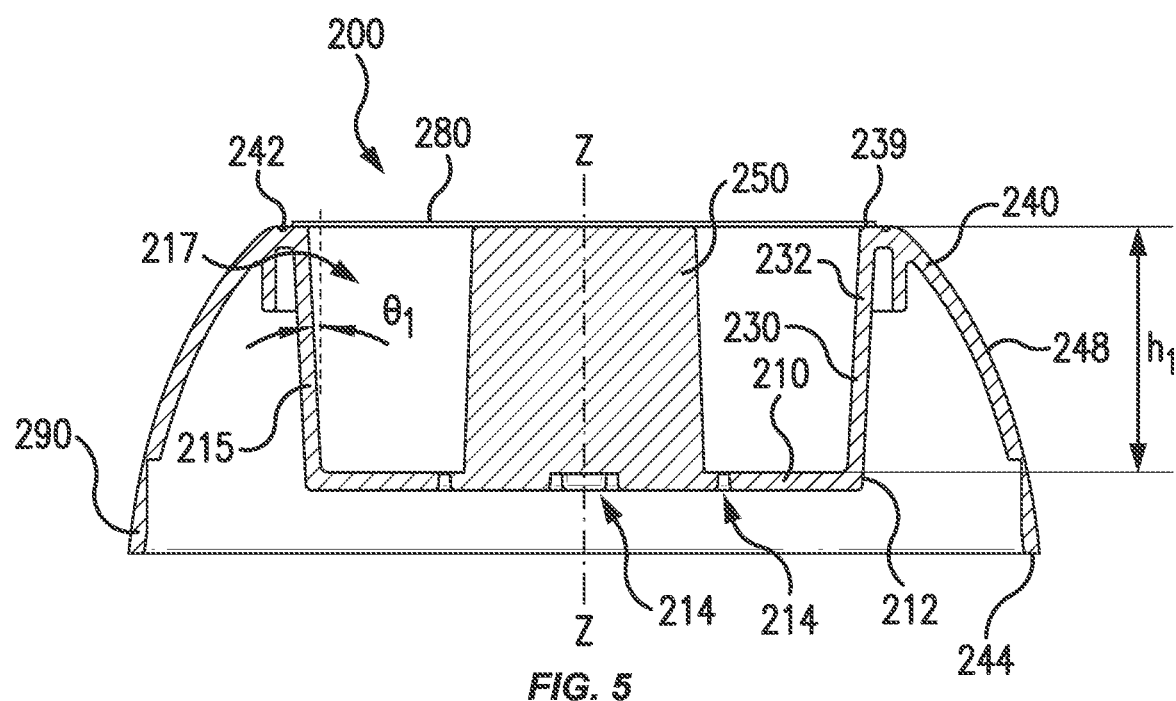
FIG. 5 shows a longitudinal cross-sectional view of the cap of FIG. 2 taken along line 5-5 of FIG. 4.

Some embodiments described herein relate to a cap 200 for a beverage-ingredient cartridge, as shown, for example, in FIGS. 2-5. Cap 200 may include a storage compartment 215 and a skirt 240 extending from storage compartment 215. Storage compartment 215 defines an interior volume 217 for storing a beverage ingredient, such as a dry beverage ingredient, as shown in FIG. 2. Storage compartment 215 includes a base 210 having a sidewall 230 extending from base 210, such as from a perimeter 212 of base 210. Sidewall 230 may extend upwardly from base 210 around an entire perimeter 212 of base 210 in a direction away from a closed lower end 122 of container 120 (when cap 200 is secured to container 120). Sidewall 230 may extend perpendicularly from base 210, or at a slight angle $\theta_1$ relative to a longitudinal axis of cap 200, as best shown in FIG. 5, such that sidewall 230 widens toward an upper end 232 and is formed as a section of a cone. Sidewall 230 may have a constant height about perimeter 212 of base 210. Base 210 may have a circular shape in a top-down view (see FIG. 4), such that storage compartment 215 may have a cylindrical or cup-like shape. However, in some embodiments, base 210 may have any of various shapes, such as an oval, square, rectangular, circular, or triangular shape, among others. Storage compartment 215 is open at upper end 232 of sidewall 230 so that the beverage ingredient may escape from storage compartment 215 through open upper end 232.

Figure 7:
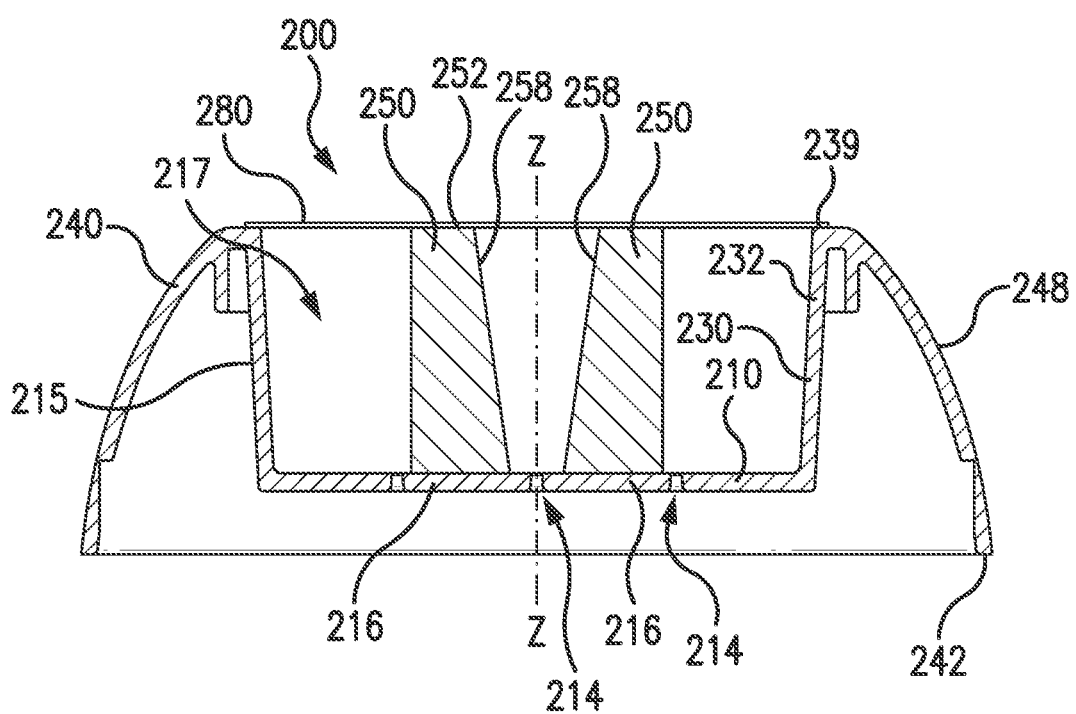
FIG. 7 shows a longitudinal cross-sectional view of a cap according to an embodiment.

Cap 200 further includes a plastic film 280, as shown in FIG. 7. Plastic film 280 may be secured to upper end 252 of column 250 and also to a rim 239 at an upper end 232 of sidewall 230 so as to seal an interior volume 217 of storage compartment 215. Plastic film 280 may be shaped similarly to base 210 of storage compartment 215. For example, plastic film 280 may have a circular shape so as to seal a storage compartment 215 having a circular base 210. In embodiments in which base 210 of storage compartment 215 has a different shape, such as an oval shape, plastic film 280 can be formed with a corresponding shape so as to seal storage compartment 215.

Plastic film 280 is configured to break or tear when a force is applied to column 250 of cap 200 that causes column 250 and separable region 216 to separate from base 210 of cap 200. Plastic film 280 is secured to both sidewall 230 (i.e., a rim 239 at upper end 232 of sidewall 230) and to column 250 (i.e., at an upper end 252 of column 250), the motion of column 250 relative to rim 239 applies a force to film 280 causing film 280 to break, such as by ripping or tearing, separating from rim 239 of sidewall 230, or a combination thereof. In some embodiments, plastic film 280 may remain attached to column 250 and may separate from rim 239 so that when column 250 is forced into an interior volume of a container 120, plastic film 280 is pulled by column 250 through opening in base 210 and into container 120, as explained in more detail with reference to FIG. 10B. As a result of plastic film 280 tearing or breaking in any manner described herein, storage compartment 215 and container 120 are open to the environment outside of cartridge 100, and a beverage ingredient stored within interior volume 217 of storage compartment 215 may escape cap 200 via an open upper end 232 of storage compartment 215 no longer covered by plastic film 280.

Plastic film 280 may be composed of any of various types of plastics, such as recyclable plastic materials. In some embodiments, plastic film 280 can be composed of polyethylene terephthalate or a polyolefin, among other materials and combinations thereof. In this way, a beverage-ingredient cartridge 100 that includes cap 200 and plastic film 280 may be easily recycled in a single-stream recycling system without separating or sorting the parts of cartridge 100, and without the need to dispose of non-recyclable materials (e.g., metal or paper). In some embodiments, plastic film 280 may be a multi-layer film. In such embodiments, plastic film 280 may include, for example, one or more of a seal layer for sealing with the cap 200, a barrier layer for preventing passage of material through plastic film 280, and a print label containing printed information, branding, logos, or the like.

In some embodiments, base 210 of cap 200 includes a line of weakness 214 that defines a separable region 216 of base 210, as shown in FIG. 3. Line of weakness 214 may be a region of base 210 having a reduced thickness such that separable region 216 is configured to break apart from base 210 at line of weakness 214 upon application of a sufficient amount of force to separable region 216. In some embodiments, line of weakness 214 may be configured to break upon application of about 5 to about 10 pounds of force. The amount of force is selected so that line of weakness 214 is unlikely to break during shipping or transportation, or if cartridge 100 having cap 200 is dropped or is otherwise subjected to an impact, while also requiring limited force to be applied by a consumer for dispensing beverage ingredients.

It is understood that line of weakness 214 may be, but need not be linear, and may be curvilinear, curved, or arcuate, and may form any of various shapes. In some embodiments, line of weakness 214 may be formed by a groove 218 in a lower surface 219 of base 210 that results in a reduced thickness of base 210 at groove 218 (see FIGS. 3 and 5). Line of weakness 214 may alternatively include scoring or a series of perforations so as to facilitate separation of separable region 216 from base 210. However, it is understood that base 210 is solid and that material may not pass through any portion of base 210 or line of weakness 214 until separable region 216 is separated from base 210. When separable region 216 is separated from base 210 upon application of a force to separable region 216, an opening is formed in base 210 that corresponds to the shape of separable region 216 defined by line of weakness 214.

Line of weakness 214 surrounds a column 250, and line of weakness 214 may follow the shape of column 250. Thus, line of weakness 214 may be arranged about at least a portion of a perimeter of column 250. As shown in FIG. 3, line of weakness 214 includes a pair of semi-circular regions connected by a linear region, so that separable region 216 defined thereby is shaped similarly to a dumbbell (e.g., having two D-shapes facing in opposing directions, connected at the middles of their straight portions). When column 250 and separable region 216 are separated from base 210 of cap 200 and enter an interior volume 127 of a container 120 of cartridge 100 to which cap 200 is secured, the transverse cross sectional shape of column 250 helps to prevent column 250 from escaping from interior volume 127 of container 120 due to the low probability of the column 250 aligning with and passing through the dumbbell shaped opening once separated from base 210. In some embodiments, line of weakness 214 may have a shape that is circular, triangular, wedge-shaped, square, semi-circular, or may be a C-shape, an H-shape, a T-shape, an S-shape, or Z-shape, among others.

Column 250 extends from separable region 216 of base 210. When a force is applied to an upper end 252 of column 250, column 250 is configured to transfer the force to separable region 216, which causes separable region 216, and column 250 attached thereto, to separate from base 210 of cap 200 at line of weakness 214. Column 250 may extend upwardly from base 210 along or parallel to a longitudinal axis Z of cap 200, and in a direction away from the closed lower end 122 of container 120 when cap 200 is secured to container 120. In some embodiments, column 250 has a maximum height $h_1$ that is the same as the height of sidewall 230 (see FIG. 5), or column 250 may have a height that is less than the height of sidewall 230. Upper end 252 of column 250 also provides a surface for sealing plastic film 280 to column 250.

In some embodiments, as shown in FIGS. 4-5, column 250 is spaced from sidewall 230 of storage compartment 215 and may be positioned centrally on base 210. Column 250 may have a transverse cross sectional area that is constant along a height of column 250, such that a shape of column 250 at an upper end is the same as the shape of column 250 at base 210. This helps to ensure efficient transmission of force from column 250 to separable region 216 of base 210. In FIG. 4, column 250 is shown as having a transverse cross sectional area that includes a linear region 253 having a first side 254 opposite a second side 255, a first curved piece 256 on first side 254 and a second curved piece 257 on second side 255. First curved piece 256 may be shaped as an arc of a circle, and second curved piece 257 may be shaped as an arc of the same circle. However, column 250 may have various other shapes and geometries as discussed herein. As column 250 is arranged within storage compartment 215, column 250 defines storage volume of storage compartment 215. In some embodiments, storage compartment 215 may have a volume of 1 to 20 cm³, 2 to 16 cm³, or 4 to 12 cm³. In some embodiments, storage compartment 215 may be configured to store a solid beverage ingredient, e.g., a powdered beverage ingredient, having a mass of about 0.5 to 8 grams, 1 to 6 grams, or 2 to 4 grams.

Figure 6A:
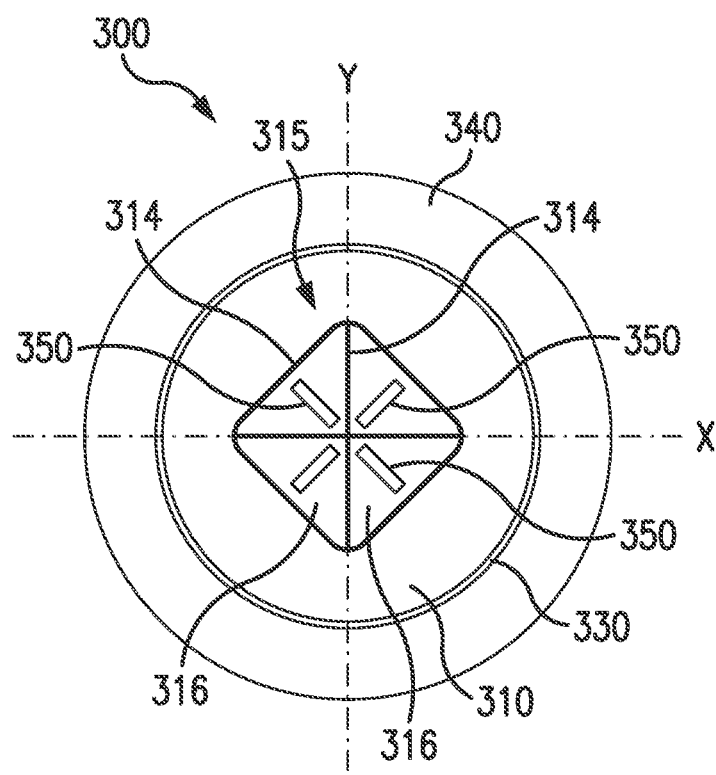
FIGS. 6A and 6B show top-down views of a cap according to embodiments.
Figure 6B:
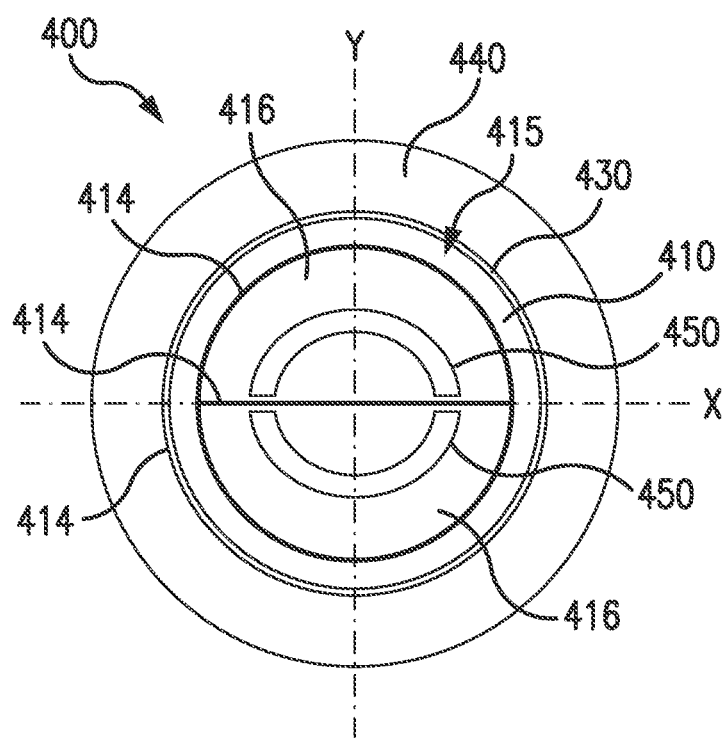

In some embodiments, the cap may include multiple separable regions formed in its base, as shown for example in FIGS. 6A and 6B. Separable regions may be arranged on the base symmetrically along one or more axes, such as an X-axis or a Y-axis, or separable regions may have radial symmetry. For example, a cap 300 as shown in the top-down view of FIG. 6A is constructed in the same manner as cap 200 of FIG. 4, and cap 300 includes a storage compartment 315 having a base 310 and sidewall 330, and a skirt 340 extending from the sidewall 330. However, cap 300 differs from cap 200 in that cap 300 lines of weakness 314 defining separable regions 316 on base 310 that together form a square shape (or rounded square shape). Each individual separable region 316 can have a wedge or triangular shape. In other embodiments, cap 400 as shown in the top-down view of FIG. 6B is constructed in a similar manner and includes a storage compartment 415 having a base 410, a sidewall 430, and a skirt 440 extending from sidewall 430. However, cap 400 includes one or more lines of weakness 414 that define separable regions 416 that together form a generally circular shape with each separable region 416 forming a section or quadrant of the circle, such as a semi-circular region.

In embodiments of cap having one or multiple separable regions, a column may extend from each separable region of base. Each column can be a wall or plate that extends perpendicularly from separable region, and the wall can be linear or arcuate in a transverse cross section (or when viewed in a top-down manner). In some embodiments, as shown in FIG. 6A, each column 350 has a transverse cross sectional area that is generally rectangular. In another embodiment, as shown in FIG. 6B, each column 450 may have a transverse cross sectional area that forms a section or an arc of a circle, or a C-shape. In some embodiments, columns may be positioned symmetrically on the base relative to an X axis, Y axis, or may be radially symmetric. In this way, a force applied to cap to dispense the stored beverage ingredients is evenly distributed to each of the columns, which may help to ensure that each separable region separates from base, and that the separable regions separate from base simultaneously.

In some embodiments, a side edge 258 of each column 250 is slanted or is angled relative to a longitudinal axis Z of cap 200, as shown in FIG. 7. The slanted side edge 258 may help to prevent or limit collisions of columns 250 when separable regions 216 are separated from base 210. Collisions of columns 250 may inhibit evacuation of beverage ingredients from a cartridge 100 including cap 200 if columns 250 are unable to fully separate from base 210 of cap 200. Further, slanted side edge 258 of column 250 may facilitate engagement of a cartridge opener 650 with column 250 and proper alignment of cartridge opener 650 relative to column 250 so that a force is applied evenly to each column 250.

In some embodiments, cap 200 may include fins 260 extending from sidewall 230 of storage compartment 215, as best shown in FIG. 4. When a force is applied to column 250 to separate separable region from base 210, plastic film 280 may break away or separate from rim 239 of sidewall 230 but remain attached to column 250. As column 250 passes through opening in base 210 and into interior volume of a container to which cap 200 is attached, plastic film 280 is drawn by column 250 toward opening on base 210 of cap 200. As plastic film 280 separates from rim 239, fins 260 may define flow paths through which beverage ingredients may escape beverage-ingredient cartridge 100. Fins 260 may serve to provide space between plastic film 280 and sidewall 230 so that beverage ingredients may flow freely along sidewall 230 to escape cap 200. In embodiments having multiple fins 260, each fin 260 may have the same shape and dimensions. Fin 260 may extend along sidewall 230 from base 210 toward upper end 232 of sidewall 230, and in some embodiments fin 260 may extend from base 210 to upper end 232 of sidewall 230. Fin 260 may extend radially inward from sidewall 230.

In some embodiments, skirt 240 of cap 200 extends outwardly from upper end 232 of sidewall 230 of storage compartment 215, such that skirt 240 has an annular configuration. Skirt 240 has an upper end 242 and a lower end 244, wherein upper end 242 is connected to upper end 232 or rim 239 of sidewall 230. Skirt 240 may have a dome-shape or a hemispherical-shape. Skirt 240 is configured to engage a container 120 of a beverage-ingredient cartridge 100 so as to provide cartridge 100 with a smooth and substantially continuous outer surface defined by an outer surface 248 of skirt 240 and an outer surface 118 of container 120 (see FIG. 1). Skirt 240 may further facilitate connection and securement of cap 200 to container 120.

In some embodiments, cap 200 is formed as a single piece and has a unitary construction. Thus, base 210, sidewall 230, skirt 240, and fins 260 (if any), may be integrally formed. Cap 200 may be formed from any of various materials, such as recyclable plastic materials, including for example a polyolefin, such as polyethylene or polypropylene. Cap 200 may be formed by injection molding, compression molding, or transfer molding, among other manufacturing methods, such as additive manufacturing (i.e., three-dimensional (3D) printing) methods, including by selective laser sintering or fused film fabrication methods.

Figure 8A:
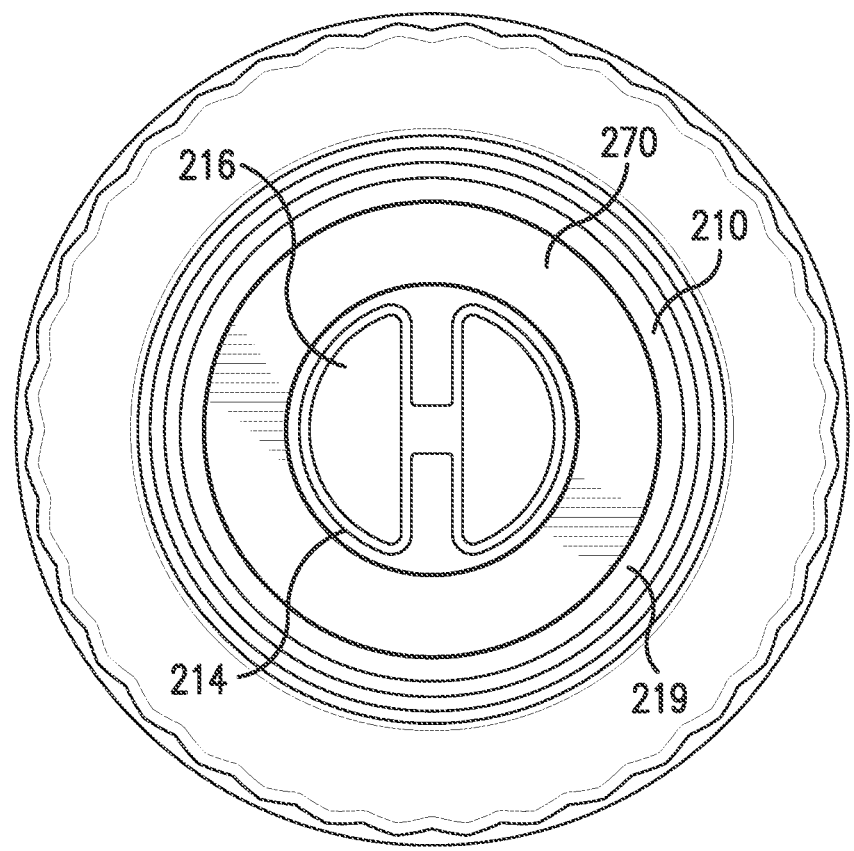
FIG. 8A shows a bottom view of the cap of FIG. 2 having an oxygen scavenger.
Figure 8B:
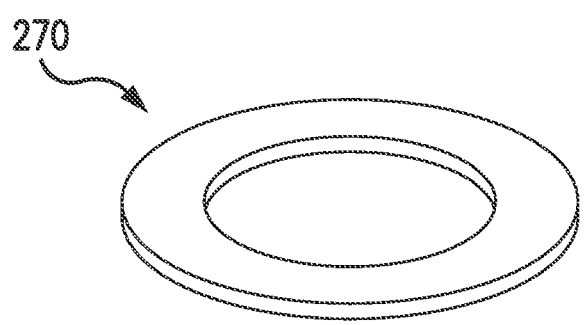
FIG. 8B shows a perspective view of the oxygen scavenger of FIG. 8A.

In some embodiments, cap 200 further includes an oxygen scavenger 270 configured to decrease the level of oxygen within a cartridge 100 so as to extend the shelf-life of a beverage-ingredient cartridge 100 having cap 200, as shown in the bottom view of cap 200 as shown in FIGS. 8A and 8B. Oxygen scavenger 270 may be planar and may have an annular shape, and may be formed as a disk with a central aperture (see FIG. 8B). Oxygen scavenger 270 having an annular shape may be formed separately from cap 200 and may be arranged on base 210 of cap 200. Oxygen scavenger 270 may be arranged on lower surface 219 of base 210. Oxygen scavenger 270 may be positioned so as to surround separable region 216 such that oxygen scavenger 270 does not overlap with line of weakness 214 or separable region 216 in order to avoid interfering with separation of separable region 216 from base 210 during dispensing of beverage ingredients from a beverage-ingredient cartridge 100.

Figure 9:
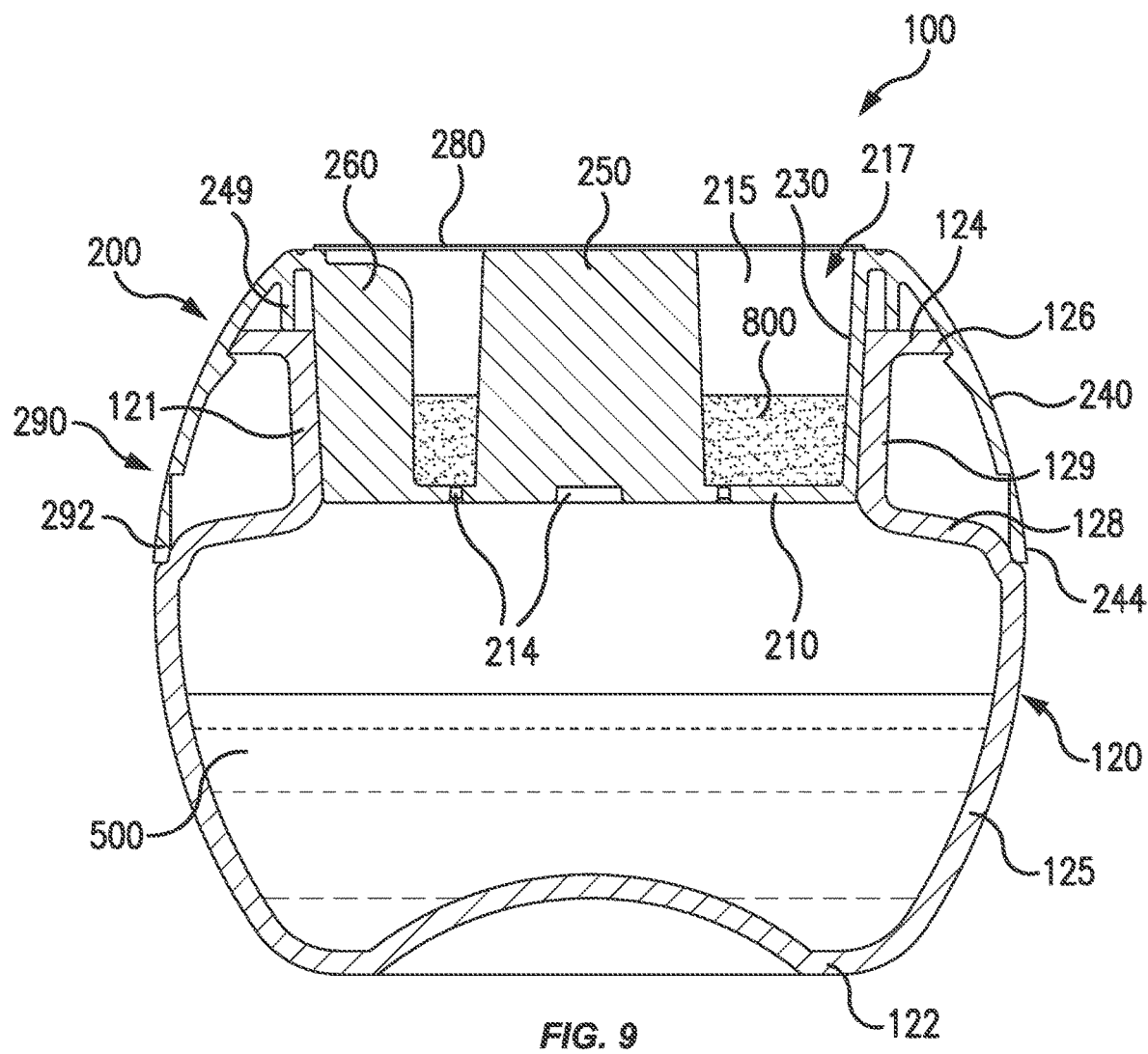
FIG. 9 shows a longitudinal cross-sectional view of the beverage-ingredient cartridge of FIG. 1 taken along line 9-9 of FIG. 1.

Beverage-ingredient cartridge 100 may be formed by securing a cap 200 as described herein to a container 120, as shown in FIG. 9. As discussed, container 120 is configured to store a first beverage ingredient, such as a liquid beverage ingredient, and cap 200 is configured to store a second beverage ingredient, such as a dry beverage ingredient. Beverage-ingredient cartridge 100 is configured such that first and second beverage ingredients may be dispensed in rapid succession and essentially simultaneously.

Beverage-ingredient cartridge 100 may have any of various shapes, and for example, cartridge 100 may have a generally spherical or spheroid configuration, as shown in FIG. 9. Beverage-ingredient cartridge 100 may have a transverse cross sectional area that is generally circular. Cartridge 100 may further have a flattened lower end 122 and a flattened upper end so that cartridge 100 does not roll when placed on a surface, which may help to facilitate stacking and storing cartridges 100, such as during shipping. Lower end 122 may also form a dome that extends toward an interior of cartridge 100. In some embodiments, beverage-ingredient cartridge 100 may be shaped as a cube, a triangular prism, a hemisphere, an egg-shape, or a rectangular prism, among others.

Container 120 of beverage-ingredient cartridge 100 has a body 125 defining an interior volume 127, and a lower end 122 opposite an upper end 124 that defines an opening 121 at upper end 124. Body 125 may widen from lower end 122 towards a shoulder region 128, such that a diameter of body 125 increases from lower end 122 toward shoulder region 128. Shoulder region 128 is inwardly turned such that first container 120 tapers at shoulder region 128 towards upper end 124. A neck 129 may extend upwardly from shoulder region 128 in a direction parallel to a longitudinal axis of cartridge 100. In some embodiments, container 120 may further include a lip 126 that extends outwardly from neck 129 in a direction transverse to a longitudinal axis of container 120.

Cap 200 can be secured to container 120 so as to cover and seal opening 121 at upper end 124 of container 120. Cap 200 may be secured to container 120 via a snap-fit connection, or by interference fit or press fit. However, in some embodiments, cap 200 may be secured to container 120 more permanently, such as via, adhesives, bonding, or welding, among other fastening methods, such that cap 200 is not readily removed from container 120.

Cap 200 may be secured to container 120 such that storage compartment 215 is positioned within opening 121 of container 120 with sidewall 230 of storage compartment 215 in facing engagement with an interior surface of neck 129 of container 120 and base 210 extends transversely through longitudinal axis Z of cartridge 100. In this way, cap 200 covers and seals opening 121 of container 120 so as to seal a beverage ingredient within container 120.

In some embodiments, cap 200 may include a tamper-evident element 290, as best shown in FIG. 9. Tamper-evident element 290 may be incorporated into skirt 240 to indicate whether a beverage-ingredient cartridge 100 having cap 200 has been tampered with, such as whether a person has attempted to remove cap 200 from container 120 of beverage-ingredient cartridge 100 after initial assembly of cartridge 100. Tamper-evident element 290 may be positioned at a lower end 244 of skirt 240 at a location at which skirt 240 contacts container 120. Tamper-evident element 290 may be in the form of one or more tabs 292 connected to skirt 240 that are configured to bend or break upon application of force to skirt tabs 292. Thus, in the event that cap 200 is attempted to be removed from container 120, such as by prying cap 200 from container 120 with a tool, one or more tabs 292 will bend or break before cap 200 can be disengaged from container 120, thereby providing a visual indication of the tampering of cartridge 100.

In some embodiments, cap 200 may further include a protrusion 249 that extends from an interior surface of skirt 240 in a direction from upper end 242 toward lower end 244 of skirt, as shown in FIG. 9. Protrusion 249 may be arranged generally parallel to a longitudinal axis of cap 200 and may extend circumferentially around skirt 240. Protrusion 249 abuts lip 126 of container 120 so as to seat cap 200 with respect to container 120. When cap 200 is secured to container 120 such that storage compartment 215 enters opening of container 120, protrusion 249 contacts lip 126 so as to prevent further insertion of storage compartment 215 into container 120.

In some embodiments, beverage-ingredient cartridge 100 is formed from recyclable plastic materials so that cartridge 100 may be recycled intact. In some embodiments, container 120 is formed of polyethylene terephthalate (PET), polypropylene (PP), or high density polyethylene (HDPE), among others. Container 120 may be formed from a material that is transparent or translucent, or that is at least partially transparent or translucent. Cap 200 may be formed of a material having a lower rigidity, and increased flexibility, relative to a material of container 120, such that cap 200 may flex or deform slightly as cap 200 is secured to container 120 in order to provide a tight or close fit with container 120. Thus, in one embodiment, for example, container 120 may be composed of PET, and cap 200 may be formed of a polyolefin. In some embodiments, cap 200 and container 120 may be formed from the same material.

In order to fill the beverage-ingredient cartridge 100, container 120 may be filled with a first beverage ingredient, such as a liquid beverage ingredient, via the opening 121 at upper end 124 of container 120. The filling process may be via a hot-filling or aseptic-filling process. Once filled, a cap 200 may be secured to container 120 within opening 121 of container 120 so as to seal container 120. Cap 200 may be secured to container 120, such as by a snap-fit. Cap 200 includes a storage compartment 215 that is open at an upper end, such that a second beverage ingredient may be filled into the storage compartment 215 via the open upper end with cartridge 100 in an upright orientation. Once storage compartment 215 is filled, a plastic film 280 may be secured to upper end of cap 200 so as to seal storage compartment 215 and second beverage ingredient. Plastic film 280 may be secured to a rim 239 at an upper end of sidewall 230 of cap 200 and to an upper end 252 of column 250 of cap 200, such as by bonding, ultrasonic welding, among other fastening methods. The ability to sequentially fill container 120 and storage compartment 215 with cartridge 100 in an upright orientation simplifies filling cartridge 100, and facilitates automated methods of filling cartridge 100 (e.g., by not necessitating pre-filling of cap 200 before its application to container 120, and by not necessitating inversion of any component for filling).

Cartridge 100 may be configured for use with a beverage vessel 600 for preparing a beverage, as shown for example in FIGS. 10A and 10B. Beverage vessel 600 may include a body defining an interior volume 610 for storing a quantity of liquid 700, such as water or carbonated water, among others. Beverage vessel 600 includes an upper end 620 defining an opening 630 and may also include a cartridge opener 650 located within beverage vessel 600 at upper end 620. Beverage vessel 600 may be configured to removably receive a beverage-ingredient cartridge 100 in opening 630 for dispensing beverage ingredients 500, 800 stored within cartridge 100 into beverage vessel 600 to mix with the liquid 700 within beverage vessel 600.

Cartridge opener 650 is configured to apply a force to cartridge 100 so as to cause dispensing of beverage ingredients from cartridge 100. Cartridge opener 650 may have any of various forms, such as a rod having a pointed end for focusing a force on a small area, or the rod may be rounded or blunt. Cartridge opener 650 may also be formed as a pyramidal or triangular shape. While a cartridge opener 650 of a beverage vessel 600 may be used to apply a force to cartridge 100, the force may be applied by any of various means, and any of various tools or implements may be used to apply a force to cartridge 100.

In order to dispense the beverage ingredients 500, 800 stored within cartridge 100, a force may be applied on cartridge 100. The force may be applied along a longitudinal axis Z of cartridge 100 e.g., (as shown by the arrow in FIG. 10A). In some embodiments as shown, for example, in FIG. 10A, cartridge 100 may be inverted and partially inserted into upper opening 630 of beverage vessel 600. As cartridge 100 is inserted into upper opening 630, cartridge opener 650 contacts column 250 of cap 200 and applies a force on column 250. Once a sufficient force is applied (e.g., a force of 5 to 40 pound-force, 10 to 35 pound-force, or 15 to 30 pound force), separable region 216 breaks apart from the rest of base 210 at line of weakness 214, forming an opening 251 in base 210 of storage compartment 215 through which first beverage ingredient 500 may escape container. Column 250 and separable region 216 are directed into an interior volume of container 120, and film 280 tears (e.g., portions of film 280 separate from each other, or edges of film 280 separate from rim 239 of sidewall 230) due to the motion of cartridge opener 650 and column 250 relative to rim 239. A portion of film 280 may remain secured to rim 239 while the remainder of film 280 remains attached to column 250, or film 280 may separate entirely from rim 239 and may remain attached to column 250 so that film 280 is drawn by column 250 in to container 120 and does not escape cartridge 100. With film 280 torn, beverage ingredients 500, 800 can readily escape cartridge 100 through upper end of cap 200. In operation, separation of separable region 216 from base 210 and tearing of film 280 may occur in rapid succession and essentially simultaneously. Because cartridge 100 is inverted for use with beverage vessel 600, beverage ingredients 500, 800 are evacuated from cartridge 100 by the force of gravity. As beverage ingredients 500, 800 escape cartridge 100, beverage ingredients 500, 800 mix with liquid 700 contained within beverage vessel 600 so as to produce a beverage. Cartridge 100 can then be removed from upper opening 630 of beverage vessel 600 so that a consumer may drink from the beverage vessel 600. After use, the empty cartridge 100 can be recycled intact.

In some embodiments, a force may be applied to cartridge 100 while cartridge 100 is in an upright orientation. Thus, a lower end 122 of cartridge 100 may be positioned on a support surface, such that when separable region separates from base, and plastic film tears, beverage ingredients 500, 800 will remain within cartridge 100 and can mix with one another within cartridge 100. A consumer may then manually pour the contents of cartridge 100 into a beverage vessel, such as vessel 600, containing water or other base liquid 700 to produce a beverage.

The described examples are illustrative, but not limiting, of the present disclosure. Other suitable modifications and adaptations of the variety of conditions and parameters normally encountered in the field, and which would be apparent to those skilled in the art, are within the spirit and scope of the disclosure.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the claims and their equivalents.

What is claimed is:

1. A beverage-ingredient cartridge, comprising:
   a container having a closed lower end and an open upper end, wherein the container is configured to store a first beverage ingredient;
   a cap secured within the open upper end of the container, wherein the cap seals the open upper end of the container, the cap comprising:
      a storage compartment comprising a base and a sidewall extending from a perimeter of the base in a direction away from a closed lower end of the container, wherein the storage compartment is configured to store a second beverage ingredient;
      a column extending from the base in a direction away from the closed lower end of the container, wherein the column is spaced from the sidewall;
      a line of weakness defining a separable region of the base, wherein the column extends from the separable region of the base; and
      a plastic film secured to a rim at an upper end of the sidewall and to the column,
   wherein the plastic film seals the storage compartment;
   wherein, upon application of a force to the column, the separable region separates from the base and the plastic film tears such that the storage compartment and the container are open to an environment outside of the beverage-ingredient cartridge.

2. The beverage-ingredient cartridge of claim 1, wherein an outer surface of the container is substantially continuous with an outer surface of the cap.

3. The beverage-ingredient cartridge of claim 1, wherein the container, the cap, and the plastic film each comprise recyclable plastic materials.

4. The beverage-ingredient cartridge of claim 1, wherein the cap is secured to the container via snap-fit.

5. The beverage-ingredient cartridge of claim 4, wherein the container comprises a neck at the open upper end, and wherein the sidewall of the cap is in facing engagement with the neck of the container within the open upper end of the container.

6. The beverage-ingredient cartridge of claim 1, wherein the cap further comprises an oxygen scavenger having an annular configuration, and wherein the oxygen scavenger is arranged on an underside of the base of the storage compartment such that the oxygen scavenger surrounds the separable region.

7. A system for making a beverage, comprising:
   the beverage-ingredient cartridge of claim 1, further comprising:
      a liquid beverage ingredient disposed within the container;
      a dry beverage ingredient disposed within the storage compartment of the cap; and
      a beverage vessel having a cartridge opener and containing a liquid, wherein when the beverage-ingredient cartridge is inverted and is engaged with the cartridge opener of the beverage vessel, the cartridge opener pushes the column into the container and thereby breaks the plastic film and separates the separable region from the base of the cap so as to release the liquid beverage ingredient and the dry beverage ingredient from the beverage-ingredient cartridge into the liquid under the force of gravity.

8. A cap for a beverage-ingredient cartridge, the cap comprising:
   a storage compartment comprising a base and a sidewall extending from a perimeter of the base, wherein the storage compartment is configured to store a beverage ingredient;
   a column extending from the base of the storage compartment and spaced apart from the sidewall;
   a line of weakness defining a separable region of the base, wherein the column extends from the separable region of the base; and
   a plastic film secured to a rim at an upper end of the sidewall and to the column, wherein the plastic film seals the storage compartment;
   wherein, upon application of a force to the column, the plastic film is configured to tear and the separable region is configured to separate from the base.

9. The cap of claim 8, wherein the column comprises a transverse cross sectional area including a linear section having a first side opposite a second side, a first curved piece on the first side and a second curved piece on the second side, and wherein the line of weakness is arranged about at least a portion of the column.

10. The cap of claim 8, wherein when the separable region separates from the base, the plastic film remains connected to the column and separates from the rim.

11. The cap of claim 10, further comprising fins extending inwardly from the sidewall that define flow paths when the plastic film breaks away from the rim.

12. The cap of claim 8, further comprising an oxygen scavenger having an annular configuration, and wherein the oxygen scavenger is arranged on an underside of the base of the storage compartment such that the oxygen scavenger surrounds the separable region.

13. The cap of claim 8, wherein the line of weakness defines a second separable region and wherein a second column extends from the second separable region.

14. The cap of claim 8, wherein the force required to break the line of weakness is about 5 to about 40 pound-force.

15. The cap of claim 8, wherein the separable region has a circular shape, and wherein the column is centrally positioned on the separable region.

16. The cap of claim 8, wherein the line of weakness comprises a groove formed on a lower surface of the base of the storage compartment.

17. A method for dispensing beverage ingredients from a beverage-ingredient cartridge, the method comprising:
   applying a force to the beverage-ingredient cartridge, wherein the beverage ingredient cartridge comprises:
      a container storing a first beverage ingredient;
      the cap of claim 8, wherein the cap is secured to an upper end of the container and stores a second beverage ingredient;

disengaging the column from the base of the cap by application of the force, such that the plastic film tears and the separable region is separated from the base of the cap; and dispensing the first and second beverage ingredients from the beverage-ingredient cartridge.

18. The method of claim 17, further comprising inverting the beverage-ingredient cartridge prior to applying the force to the column of the cap, such that dispensing the first and second beverage ingredients occurs under the force of gravity.

19. The method of claim 17, wherein applying the force to the column of the cap is performed by a cartridge opener applied along a longitudinal axis of the beverage-ingredient cartridge.

20. The method of claim 17, wherein when the column is disengaged from the base of the cap, the plastic film separates from the rim and remains attached to the column.

\* \* \* \* \*